US011996282B2

(12) United States Patent
Zhang et al.

(10) Patent No.: US 11,996,282 B2
(45) Date of Patent: May 28, 2024

(54) METHOD AND SYSTEM FOR CLEANING A FIELD EMISSION CATHODE DEVICE

(71) Applicant: NCX Corporation, Raleigh, NC (US)

(72) Inventors: Jian Zhang, Durham, NC (US); Cheng Qian, Cary, NC (US)

(73) Assignee: NCX CORPORATION, Raleigh, NC (US)

( * ) Notice: Subject to any disclaimer, the term of this patent is extended or adjusted under 35 U.S.C. 154(b) by 0 days.

(21) Appl. No.: 18/247,262

(22) PCT Filed: Sep. 29, 2021

(86) PCT No.: PCT/IB2021/058950
§ 371 (c)(1),
(2) Date: Mar. 29, 2023

(87) PCT Pub. No.: WO2022/070104
PCT Pub. Date: Apr. 7, 2022

(65) Prior Publication Data
US 2024/0079197 A1 Mar. 7, 2024

Related U.S. Application Data

(60) Provisional application No. 63/085,418, filed on Sep. 30, 2020.

(51) Int. Cl.
*H01J 9/02* (2006.01)
*B08B 7/02* (2006.01)
*H01J 1/304* (2006.01)

(52) U.S. Cl.
CPC .............. *H01J 9/025* (2013.01); *B08B 7/026* (2013.01); *H01J 1/3048* (2013.01); *H01J 2209/017* (2013.01)

(58) Field of Classification Search
CPC .... H01J 9/025; H01J 1/3048; H01J 2209/017; B08B 7/026
See application file for complete search history.

(56) References Cited

U.S. PATENT DOCUMENTS

| | | | | |
|---|---|---|---|---|
| 6,286,687 | B1 | 9/2001 | Schuller | |
| 10,734,181 | B1 * | 8/2020 | Liu ......................... | H01J 9/025 |
| 2005/0202578 | A1 | 9/2005 | Yaniv et al. | |

FOREIGN PATENT DOCUMENTS

| | | |
|---|---|---|
| CN | 103831235 | 6/2014 |
| CN | 109065439 | 12/2018 |

(Continued)

OTHER PUBLICATIONS

Notice of Reasons for Rejection mailed Feb. 27, 2024, issued in related Japanese application 2023-520017.

*Primary Examiner* — Donald L Raleigh
(74) *Attorney, Agent, or Firm* — Womble Bond Dickinson (US) LLP

(57) ABSTRACT

A method and system for cleaning a field emission cathode device, the field emission cathode device including a substrate having a field emission layer engaged therewith, includes engaging the field emission cathode device with a vibration device such that the substrate is disposed above the field emission layer. The field emission cathode device is then vibrated with the vibration device in an X, Y, or Z direction at a predetermined frequency and at a predetermined amplitude for a predetermined time duration so as to clean the field emission cathode device by dislodging non-embedded particles from the field emission layer.

10 Claims, 4 Drawing Sheets

(56) References Cited

FOREIGN PATENT DOCUMENTS

| | | |
|---|---|---|
| EP | 1930933 | 6/2008 |
| GB | 1094218 | 12/1967 |
| JP | 2000-340113 | 12/2000 |
| JP | 2003-109505 | 4/2003 |
| JP | 2010-021177 | 1/2010 |
| WO | WO 02/03413 | 1/2002 |

* cited by examiner

METHOD AND SYSTEM FOR CLEANING A FIELD EMISSION CATHODE DEVICE

CROSS-REFERENCE TO RELATED APPLICATIONS

This application is a national stage filing under 35 U.S.C. 371 of PCT/IB2021/058950, filed Sep. 29, 2021, which International Application was published by the International Bureau in English on Apr. 7, 2022, as WO 2022/070104, and application claims priority from U.S. application Ser. No. 63/085,418, filed on Sep. 30, 2020, which applications are hereby incorporated in their entirety by reference in this application.

BACKGROUND

Field of the Disclosure

The present application relates to field emission cathode devices and, more particularly, to a method and system for cleaning a field emission cathode device.

Description of Related Art

Figure 1:
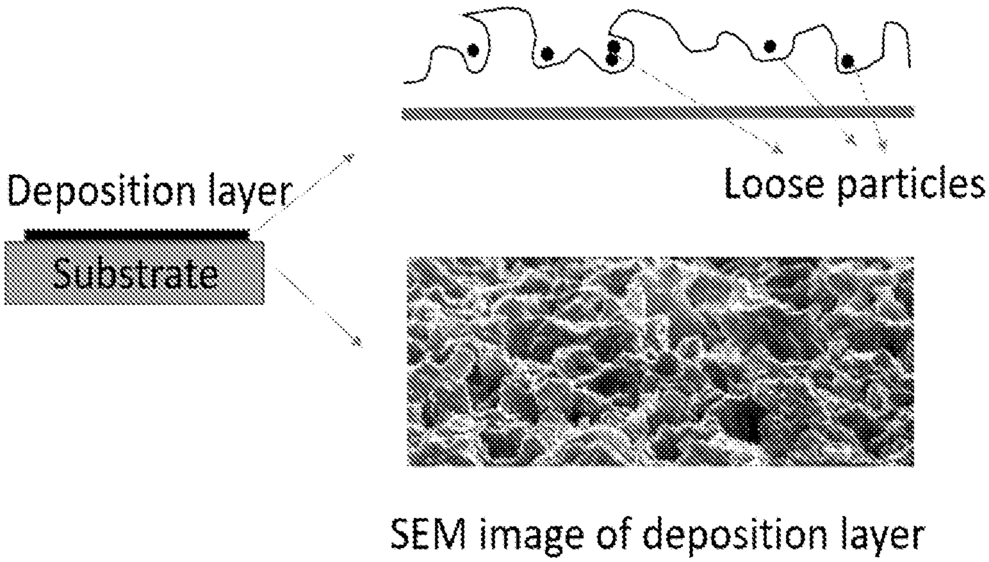

A field emission cathode device generally includes a cathode substrate (usually comprised of a metal or other conducting material such as stainless steel, tungsten, molybdenum, doped silicon), a layer of a field emission material (e.g., nanotubes, nanowires, graphene, amorphous carbon) disposed on the substrate, and, if necessary, an additional layer of an adhesion material disposed between the substrate and the field emission material (see, e.g., FIG. 1). Some typical applications of a field emission cathode device include, for example, electronics operable in a vacuum environment, field emission displays, and X-ray tubes. In some such applications, the field emission cathode device(s) must be clean or be thoroughly cleaned in order to be used effectively in ultra-clean and/or high vacuum environments.

With field emission materials and adhesion materials deposited on a surface of the cathode substrate, however, it may be difficult to clean the field emission cathode device prior to or after use. The surface deposition (field emission) material typically includes a mixture of nanomaterials (e.g., nanotubes, graphene, nanowires, etc.) and adhesive materials (e.g., glass particles, metal particles, etc.). Even after cleaning the field emission cathode device using standard cleaning processes (e.g., blowing the field emission material surface with dry air, contacting the field emission material surface with adhesive tape and then removing the tape, etc.), the field emission material surface is still capable of releasing small loose particles (e.g., particles that are not securely embedded in or adhered to the field emission material and/or the adhesive layer) through actual operation or even just over time. Such dislodged particles lead to contamination of the vacuum environment, causing, for example, electrical arcing and electrode short-circuiting within the vacuum environment. Generally, a source of loose particles in the context of such field emission cathode devices includes lack of adhesion of some of the surface deposition/field emission material to the adhesive layer or to the substrate itself, which may cause the non-embedded particles to work loose during device operation. Also, the cathode surface (e.g., the field emission material layer) is generally not smooth, and includes uneven surface morphology, such as peaks, valleys, and caves (see, e.g., FIG. 1), which can trap and hold non-embedded particles that are not readily or completely removed by standard cleaning procedures.

Thus, there exists a need for a method and system for effectively cleaning a field emission cathode device so as to desirably remove particles that are not securely embedded in or adhered to the cathode surface, wherein such improvements would minimize or eliminate electrical arcing and/or electrode short-circuiting within the vacuum environment.

SUMMARY OF THE DISCLOSURE

The above and other needs are met by aspects of the present disclosure which includes, without limitation, the following example embodiments and, in one particular aspect, provides a method of cleaning a field emission cathode device, wherein the field emission cathode device includes a substrate having a field emission layer engaged therewith. Such a method comprises engaging the field emission cathode device with a vibration device such that the substrate is disposed above the field emission layer (e.g., such that the cathode, namely the field emission layer deposited on the substrate, is "upside down"); and vibrating the field emission cathode device with the vibration device in an X, Y, or Z direction at a predetermined frequency and at a predetermined amplitude for a predetermined time duration so as to clean the field emission cathode device by dislodging non-embedded particles from the field emission layer.

Another example aspect provides a system for cleaning a field emission cathode device, wherein the field emission cathode device including a substrate having a field emission layer engaged therewith. Such a system comprises a vibration device arranged to receive the field emission cathode device such that the substrate is disposed above the field emission layer (e.g., such that the cathode, namely the field emission layer deposited on the substrate, is "upside down"). The vibration device is further arranged to vibrate the field emission cathode device in an X, Y, or Z direction at a predetermined frequency and at a predetermined amplitude for a predetermined time duration so as to clean the field emission cathode device by dislodging non-embedded particles from the field emission layer.

The present disclosure thus includes, without limitation, the following example embodiments:

Example Embodiment 1: A method of cleaning a field emission cathode device, the field emission cathode device including a substrate having a field emission layer engaged therewith, said method comprising engaging the field emission cathode device with a vibration device such that the substrate is disposed above the field emission layer; and vibrating the field emission cathode device with the vibration device in an X, Y, or Z direction at a predetermined frequency and at a predetermined amplitude for a predetermined time duration so as to clean the field emission cathode device by dislodging non-embedded particles from the field emission layer.

Example Embodiment 2: The method of any preceding example embodiment, or combinations thereof, comprising directing a pressurized airstream toward the field emission layer in association with vibrating the field emission cathode device.

Example Embodiment 3: The method of any preceding example embodiment, or combinations thereof, comprising removing electrostatic charges from the field emission layer, the electrostatic charges normally retaining the non-embedded particles in engagement with the field emission layer, in association with vibrating the field emission cathode device.

Example Embodiment 4: The method of any preceding example embodiment, or combinations thereof, comprising applying a voltage of at least about 1 kV to an electrode disposed adjacent to and in spaced apart relation with the field emission layer, in association with vibrating the field emission cathode device, an electric field generated by the electrode attracting the non-embedded particles from the field emission layer.

Example Embodiment 5: The method of any preceding example embodiment, or combinations thereof, wherein vibrating the field emission cathode device comprises vibrating the field emission cathode device in the X, Y, or Z direction at the predetermined frequency of between about 1 Hz and about 1 kHz and at the predetermined amplitude of between about 1 mm and about 1 cm for the predetermined time duration of between about 1 minute and about 10 hours.

Example Embodiment 6: A system for cleaning a field emission cathode device, the field emission cathode device including a substrate having a field emission layer engaged therewith, said system comprising a vibration device arranged to receive the field emission cathode device such that the substrate is disposed above the field emission layer, the vibration device being further arranged to vibrate the field emission cathode device in an X, Y, or Z direction at a predetermined frequency and at a predetermined amplitude for a predetermined time duration so as to clean the field emission cathode device by dislodging non-embedded particles from the field emission layer.

Example Embodiment 7: The system of any preceding example embodiment, or combinations thereof, comprising an air emission device arranged adjacent to the vibration device to direct a pressurized airstream toward the field emission layer in association with the vibration device vibrating the field emission cathode device.

Example Embodiment 8: The system of any preceding example embodiment, or combinations thereof, comprising an ionizer or an electrostatic elimination device disposed adjacent to the vibration device and arranged to remove electrostatic charges from the field emission layer, the electrostatic charges normally retaining the non-embedded particles in engagement with the field emission layer, in association with the vibration device vibrating the field emission cathode device.

Example Embodiment 9: The system of any preceding example embodiment, or combinations thereof, comprising an electrode disposed adjacent to the vibration device in spaced apart relation with the field emission layer; and a voltage source arranged to apply a voltage of at least about 1 kV to the electrode in association with the vibration device vibrating the field emission cathode device, an electric field generated by the electrode attracting the non-embedded particles from the field emission layer.

Example Embodiment 10: The system of any preceding example embodiment, or combinations thereof, wherein the vibration device is arranged to vibrate the field emission cathode device in the X, Y, or Z direction at the predetermined frequency of between about 1 Hz and about 1 kHz and at the predetermined amplitude of between about 1 mm and about 1 cm for the predetermined time duration of between about 1 minute and about 10 hours.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 2A:
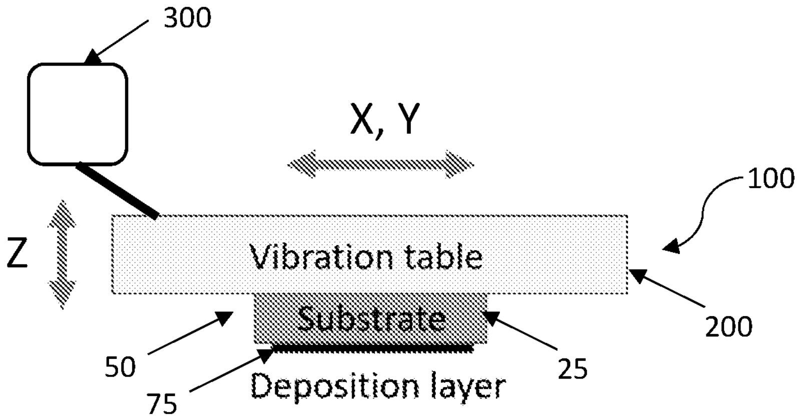
Figure 2B:
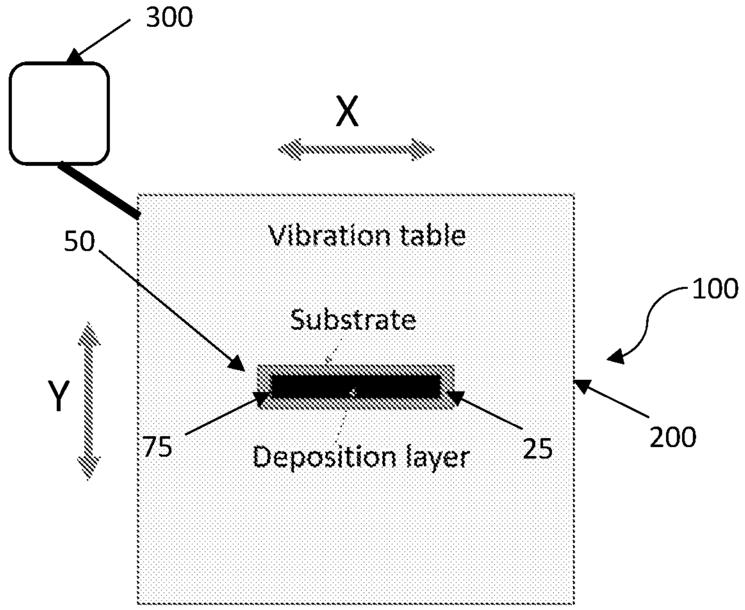
Figure 3:
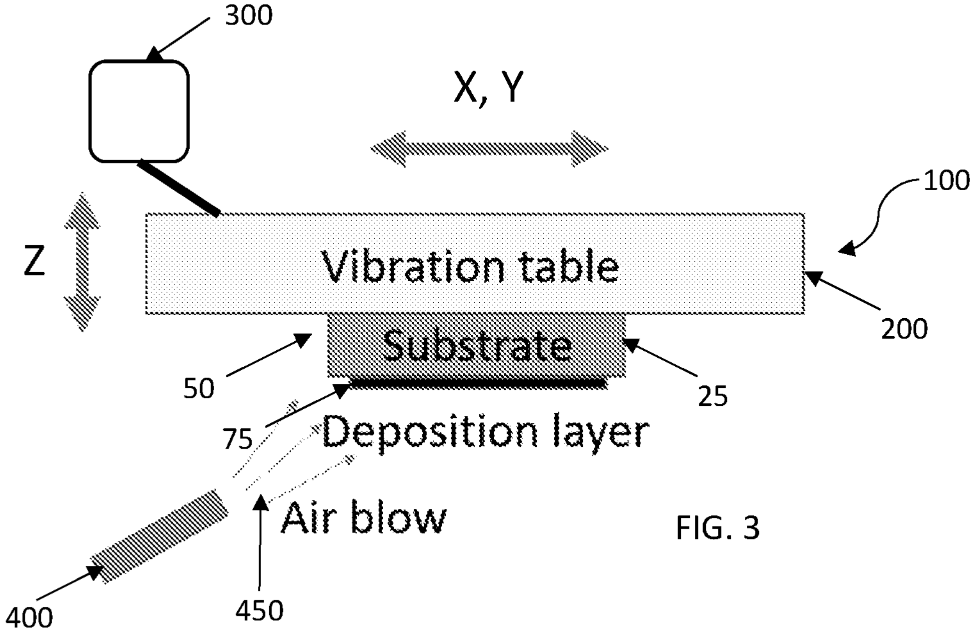
Figure 4:
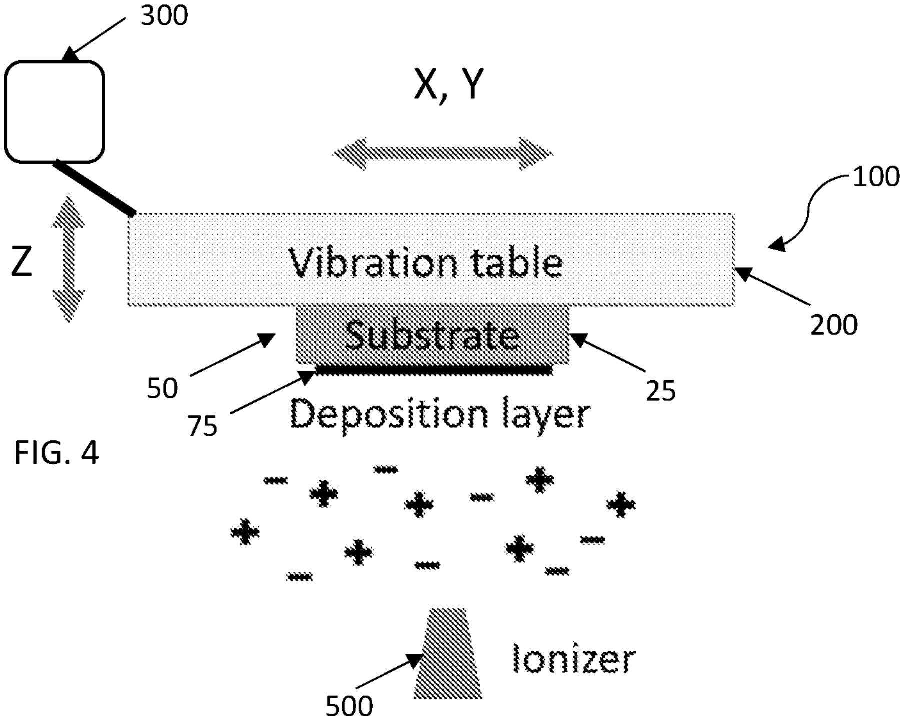
Figure 5:
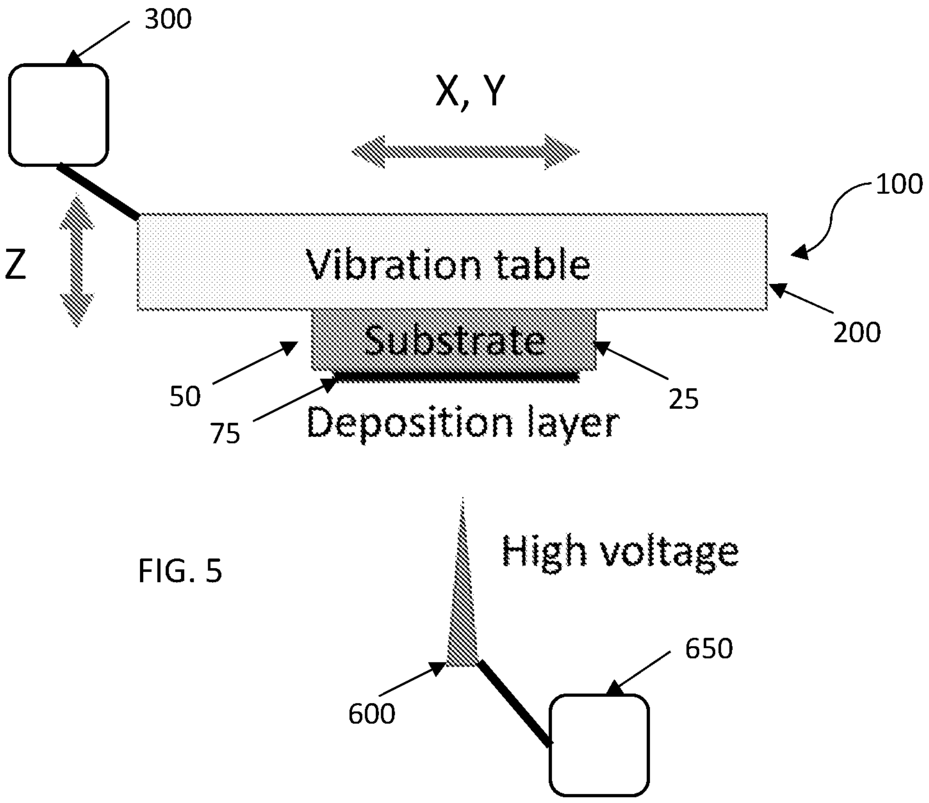

Having thus described the disclosure in general terms, reference will now be made to the accompanying drawings, which are not necessarily drawn to scale, and wherein:

FIG. 1 schematically illustrates an example of a field emission cathode device and the nature of the field emission material deposition layer engaged with the cathode substrate;

FIG. 2A schematically illustrates a side view of a vibration device for receiving and cleaning a field emission cathode device, according to one aspect of the present disclosure;

FIG. 2B schematically illustrates a bottom plan view of a vibration device for receiving and cleaning a field emission cathode device, according to the aspect of the present disclosure shown in FIG. 2A;

FIG. 3 schematically illustrates a side view of a system for receiving and cleaning a field emission cathode device, according to one aspect of the present disclosure;

FIG. 4 schematically illustrates a side view of a system for receiving and cleaning a field emission cathode device, according to an alternate aspect of the present disclosure; and FIG. 5 schematically illustrates a side view of a system for receiving and cleaning a field emission cathode device, according to another alternate aspect of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIGS. 2A, 2B, and 3-5 illustrate various aspects of a method and system for cleaning a field emission cathode device (see, e.g., FIG. 1), wherein such a field emission cathode device generally includes a cathode comprising a substrate (usually comprised of a metal or other conducting material such as stainless steel, tungsten, molybdenum, doped silicon), a layer of a field emission material disposed on the substrate, and, if necessary, an additional layer of an adhesion material (not shown) disposed between the substrate and the field emission material.

In one example aspect, as shown in FIGS. 2A and 2B, the system 100 for cleaning a field emission cathode device 50, comprises a vibration device 200 (e.g., a vibration table) arranged to receive the field emission cathode device 50 such that the substrate 25 thereof is disposed above the field emission layer 75 (e.g., such that the cathode 50, namely the field emission layer 75 deposited on the substrate 25, is "upside down"). The cathode device 50 can be, but does not have to be, disposed in a horizontal plane in order for the substrate 25 to be disposed above the field emission layer 75 (e.g., such that the cathode 50 is considered to be "upside down"). For example, the cathode device 50 may be tilted or inclined with respect to the horizontal plane, with the substrate 25 disposed between the vibration table 200 and the field emission layer 75, such that at least a portion of the substrate 25 is disposed above at least a portion of the field emission layer 75 (e.g., such that the cathode device 50 is considered to be "upside down"). In other instances, for example, where the substrate 25 is cylindrical and the field emission layer 75 is deposited on the cylindrical surface of the substrate 25, and the cathode device 50 is received by the vibration table 200 in a horizontal orientation, at least a portion of the substrate 25 will be disposed above at least a portion of the field emission layer 75 (e.g., such that the cathode device 50 is considered to be "upside down").

Once the cathode device 50 is received and supported by the vibration device 200, the vibration device 200 is further arranged to vibrate the field emission cathode device 50 in an X, Y, or Z direction at a predetermined frequency and at a predetermined amplitude for a predetermined time duration so as to clean the field emission cathode device 50 by dislodging non-embedded particles from the field emission layer 75. For example, the vibration device 200 is arranged to vibrate the field emission cathode device 50 in the X, Y, and/or Z direction at a predetermined frequency of between about a few Hz (e.g., 1 Hz) and about a few hundred Hz (e.g., 1 kHz) and at a predetermined vibration/displacement amplitude of between about 1 mm and about 1 cm for a predetermined time duration of between about a few minutes (e.g., 1 minute) and about a few hours (e.g., 10 hours). One skilled in the art will appreciate that the vibration of the field emission cathode device 50 can be performed under many different conditions and combinations of conditions of or related to any or all of the direction, frequency, amplitude, and time duration parameters noted herein. Moreover, the vibration device 200 (e.g., vibration table) can have a suitable programmable controller 300 in communication therewith for selecting any or all of the vibration parameters.

As previously noted, one purpose/function of the cleaning methods disclosed herein is to remove non-embedded or loose particles from the field emission cathode device 50 and, more particularly, from the field emission 75 and/or adhesion layers thereof. Accordingly, in some aspects, the vibration of the cathode device 50 using the vibration device 200 (e.g., a vibration table) can be accompanied by (or preceded by or followed by) other cleaning steps using other cleaning devices.

For example, in one aspect (see, e.g., FIG. 3), an air emission device 400 is arranged adjacent to the vibration device 200, and to direct a pressurized airstream 450 toward the field emission layer 75 such that the airstream 450 impinges upon the surface having the field emission 75 and/or adhesion layers deposited thereon. As disclosed, the airstream 450 (or any suitable gas stream) is applied to the cathode device 50 in association with the vibration device 200 vibrating the field emission cathode device 50, wherein said association of the airstream 450 can be contemporaneous or sequential (either before or after) with the vibration by the vibration table 200.

In another aspect, an ionizer or an electrostatic elimination device 500 (see, e.g., FIG. 4) is disposed adjacent to the vibration device 200 and is arranged to remove electrostatic charges 550 from the field emission layer 75. Normally, such electrostatic charges 550 tend to retain the non-embedded/loose particles in engagement with the field emission 75 and/or adhesion layer. As disclosed, the removal of the electrostatic charges 550 is performed on the cathode device 50 in association with the vibration device 200 vibrating the field emission cathode device 50, wherein said association of the electrostatic charge removal can be contemporaneous or sequential (either before or after) with the vibration by the vibration table 200.

In yet another aspect, an electrode 600 (see, e.g., FIG. 5) is disposed adjacent to the vibration device 200 in spaced apart relation with the field emission layer 75, and a voltage source 650 is arranged to apply a voltage of at least about a few thousand Volts (e.g., at least 1 kV) to the electrode 600. An electric field generated by the electrode 600 having the high voltage applied thereto thus attracts the non-embedded/loose particles from the field emission 75 and/or adhesion layer. As disclosed, applying the electric field attracting the non-embedded/loose particles away from the cathode device 50 is performed in association with the vibration device 200 vibrating the field emission cathode device 50, wherein said association of the electric field particle removal measure can be contemporaneous or sequential (either before or after) with the vibration by the vibration table 200.

One skilled in the art will further appreciate that any or all of these additional cleaning measures can, separately or in combination, be combined with the vibration by the vibration table 200 to accomplish the cleaning of the cathode device 50. Such aspects of the present disclosure thus provide a method and system for effectively cleaning a field emission cathode device so as to effectively remove particles that are not securely embedded in or adhered to the cathode surface, wherein such improved cleaning methods and systems contribute to minimizing or eliminating electrical arcing and/or electrode short-circuiting within the vacuum environment in which example field emission cathode devices operate.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A method of cleaning a field emission cathode device, the field emission cathode device including a substrate having a field emission layer engaged therewith, said method comprising:

engaging the field emission cathode device with a vibration device such that the substrate is disposed above the field emission layer; and vibrating the field emission cathode device with the vibration device in an X, Y, or Z direction at a predetermined frequency and at a predetermined amplitude for a predetermined time duration so as to clean the field emission cathode device by dislodging non-embedded particles from the field emission layer.

2. The method of claim 1, comprising directing a pressurized airstream toward the field emission layer in association with vibrating the field emission cathode device.

3. The method of claim 1, comprising removing electrostatic charges from the field emission layer, the electrostatic charges normally retaining the non-embedded particles in engagement with the field emission layer, in association with vibrating the field emission cathode device.

4. The method of claim 1, comprising applying a voltage of at least about 1 kV to an electrode disposed adjacent to and in spaced apart relation with the field emission layer, in association with vibrating the field emission cathode device, an electric field generated by the electrode attracting the non-embedded particles from the field emission layer.

5. The method of claim 1, wherein vibrating the field emission cathode device comprises vibrating the field emission cathode device in the X, Y, or Z direction at the predetermined frequency of between about 1 Hz and about 1 kHz and at the predetermined amplitude of between about 1 mm and about 1 cm for the predetermined time duration of between about 1 minute and about 10 hours.

6. A system for cleaning a field emission cathode device, the field emission cathode device including a substrate having a field emission layer engaged therewith, said system comprising:

a vibration device arranged to receive the field emission cathode device such that the substrate is disposed above the field emission layer, the vibration device being further arranged to vibrate the field emission cathode device in an X, Y, or Z direction at a predetermined frequency and at a predetermined amplitude for a predetermined time duration so as to clean the field emission cathode device by dislodging non-embedded particles from the field emission layer.

7. The system of claim 6, comprising an air emission device arranged adjacent to the vibration device to direct a pressurized airstream toward the field emission layer in association with the vibration device vibrating the field emission cathode device.

8. The system of claim 6, comprising an ionizer or an electrostatic elimination device disposed adjacent to the vibration device and arranged to remove electrostatic charges from the field emission layer, the electrostatic charges normally retaining the non-embedded particles in engagement with the field emission layer, in association with the vibration device vibrating the field emission cathode device.

9. The system of claim 6, comprising an electrode disposed adjacent to the vibration device in spaced apart relation with the field emission layer; and a voltage source arranged to apply a voltage of at least about 1 kV to the electrode in association with the vibration device vibrating the field emission cathode device, an electric field generated by the electrode attracting the non-embedded particles from the field emission layer.

10. The system of claim 6, wherein the vibration device is arranged to vibrate the field emission cathode device in the X, Y, or Z direction at the predetermined frequency of between about 1 Hz and about 1 kHz and at the predetermined amplitude of between about 1 mm and about 1 cm for the predetermined time duration of between about 1 minute and about 10 hours.

* * * * *